United States Patent [19]
Pellerin

[11] Patent Number: 5,941,546
[45] Date of Patent: Aug. 24, 1999

[54] VEHICLE SUSPENSION SYSTEM

[76] Inventor: Luc Pellerin, 577 Chemin Nord, Eastman, Québec, Canada, J0E 1P0

[21] Appl. No.: 08/907,074

[22] Filed: Aug. 6, 1997

Related U.S. Application Data

[63] Continuation-in-part of application No. 08/797,205, Feb. 11, 1997, Pat. No. 5,820,153, which is a continuation-in-part of application No. 08/588,725, Jan. 19, 1996, abandoned.

[51] Int. Cl.$^6$ .................................................. B60G 11/00
[52] U.S. Cl. ........................... 280/124.116; 280/124.106; 280/124.112; 280/124.162
[58] Field of Search ....................... 280/124.116, 124.11, 280/124.111, 124.112, 124.157, 124.106, 124.107, 124.162, 124.164, 124.165, 124.177, 124.179

[56] References Cited

U.S. PATENT DOCUMENTS

| | | |
|---|---|---|
| 3,202,441 | 8/1965 | Tea . |
| 4,826,203 | 5/1989 | Kijima et al. . |
| 4,874,185 | 10/1989 | Kijima et al. . |
| 5,048,860 | 9/1991 | Kanai et al. . |
| 5,127,666 | 7/1992 | Fujinaka et al. . |

FOREIGN PATENT DOCUMENTS 1238351   6/1988   Canada .

OTHER PUBLICATIONS

Canadian Patent Application 2,033,854, Sawai, S., filed Jan. 9, 1991.
Canadian Patent Application 2,064,278, Nishida et al., filed Mar. 27, 1992.
Canadian Patent Application 2,066,390, Velazquez, Alfonso B., filed Apr. 16, 1992.

*Primary Examiner*—Eric Culbreth
*Attorney, Agent, or Firm*—Merek & Voorhees

[57] ABSTRACT

A suspension system for controlling the relative displacement between a pair of laterally opposed ground engaging components of a vehicle and the frame of the vehicle is described herein. Each of the ground engaging components is individually mounted to the frame by a frame connecting component. The frame connecting component is hingedly mounted to the frame so as to allow a relative pivotal movement between each of the frame connecting components and the frame in a direction substantially parallel to the longitudinal axis of the frame. The suspension system includes a first suspension member pivotally mounted to the frame. The first suspension member is free to pivot relatively to the frame about a first suspension member pivotal axis that is in a substantially transversal relationship with the frame. The suspension system also includes a second suspension member pivotally mounted to the first suspension member so as to allow the first suspension member and the second suspension member to pivot relatively to one another along a second suspension member pivotal axis that is in a substantially perpendicular relationship with the first suspension member pivotal axis. The suspension system further includes a biasing mechanism mounted both to the frame and to the second suspension member. The biasing mechanism bias the second suspension member towards a second suspension member initial predetermined position. A pair of motion transmitting members are respectively mounted to one of the frame connecting components and to the second suspension member.

11 Claims, 10 Drawing Sheets

VEHICLE SUSPENSION SYSTEM

REFERENCE TO PRIOR APPLICATIONS

This is a continuation-in-part of application Ser. No. 08/797,205, filed Feb. 11, 1997 and now U.S. Pat. No. 5,820,153, which is a continuation-in-part of application Ser. No. 08/588,725, filed Jan. 19, 1996, now abandoned.

FIELD OF THE INVENTION

The present invention relates to the field of vehicle suspension systems and is particularly concerned with a vehicle suspension system having a pair of perpendicularly oriented pivotal articulations.

BRIEF DESCRIPTION OF THE PRIOR ART

Most conventional modern vehicles are provided with a suspension system connecting a frame of the vehicle to components of the vehicle which engage the ground surface such as wheels, skis, tracks or the like. Conventional modern suspension systems are made up of many elements including control arms, stabilizer bars and flexible elements such as springs and shock absorbers. The suspension systems must be designed to allow each ground engaging component to be moved up and down to the full extent required to keep all of the ground engaging elements in continuous contact with the ground surface while restricting such movement to what is consistent with adequate comfort requirements.

The flexible elements of the suspension system must be strong enough to support the load without using up the ground engaging components travel that is needed for bump deflections and, yet, soft enough to insulate the passenger compartment from suspension movements. It is also desirable that the suspension system should allow the ground engaging component to move back and forth to a small extent (horizontal compliance). Far more important, however, is the need for the suspension links to avoid tilting the ground engaging elements far out of their planes of motion (camber changes during deflections). The latter characteristic is vital to the safe handling of the vehicle when the latter is in motion. Precise guidance of the ground engaging element throughout its full course of deflection should be assured to minimize not only camber changes, but also changes in caster, track and wheel base.

The suspension systems on modern vehicles are thus designed to combine many important variables in a compromise to achieve suitable handling and ride characteristics. Design objectives differ depending on the type of vehicle and the conditions in which it is destined to be operated.

Some variables are particularly important when designing suspension systems. For example, the spring rate which determines, in part, the stiffness with which the suspension system will transmit an impacting force from the ground engaging elements to the frame of the vehicle is particularly important.

A second crucial variable is the so-called roll effect. Roll is the sway or lean that occurs in the body of the vehicle due to side forces acting on the latter. The side forces are usually centrifugal forces generated by the yawing of the vehicle. Yaw is usually driver induced by steering wheel input, but can also be caused by roadway unevenness or a difference in tire-to-roadway friction between left and right wheels, especially under hard acceleration or braking.

One popular type of modern suspension system is the so-called independent suspension system wherein each road engaging element is provided with an independent spring and dampening component. Most conventional modern vehicles having independent-type suspension systems use stabilizer bars also called anti-roll bars to control the amount of roll. The rate of resistance to roll of conventional stabilizer bars is typically substantially linear. It is the combined action of the stabilizer bars and the spring stiffness that determines how much roll of the frame will be induced by a given lateral force.

Typically, the stabilizer bar is connected between the suspension control arms on both sides of the vehicle. When the vehicle body comes closer to the road surface, the suspension is in jounce. When jounce affects both left and right wheels equally, the stabilizer bar follows the suspension and so it has no effect on the vehicle. As the vehicle encounters a rise in road surface with a single wheel, the upward force is transferred across the stabilizer bar producing an upward force on the suspension on the opposite side of the vehicle. This transfers a portion of the jounce load to the opposite suspension. The action typically twists the stabilizer bar much like a torsion bar. This twisting action increases the effective spring rate of the suspension in jounce. The transmission of forces when a single wheel is raised is detrimental to the comfort of the passengers and to the wheel compliance with the ground surface. The stronger the anti-roll mechanism being used in a conventional suspension, the more induced roll to the chassis will be generated.

The stabilizer bar can be considered as a spring that will resist the independent action of the suspension. It will transfer some of the load from one suspension to the other, in order to help prevent excessive vehicle body roll. As one wheel drops, or rebounds, due to a drop in the road surface, the stabilizer bar exerts an upward force on the suspension of the wheel encountering the low spot. This will reduce the effective spring rate of that wheel. As a vehicle enters a turn, the vehicle body leans towards the outside of the turn and this forces the outside suspension into compression, while the suspension on the inside will go on rebound. The stabilizer bar opposes both of these motions by increasing the effective spring rate of the outside wheel and decreasing the effect of spring rate of the inside wheel.

The stabilizer bar also resists body movements due to wind gusts and rolling road surfaces that may be noticeable at highway speeds by applying forces on the suspension that oppose vehicles input forces, i.e. one wheel going into jounce while the other goes into rebound.

A reduced vehicle spring rate can be used when sturdy stabilizer bars are used. This will provide the vehicle with soft rise springing while at the same time have the handling characteristics of stiffer springing.

However, a compromise must again be made in the choice of the stiffness of the stabilizer bar. Indeed, if the stabilizer bar is made particularly rigid, the vehicle will be difficult to control on rough road surfaces. Conversely, if the stabilizer bar is not stiff enough, it loses its effects.

For vehicles requiring a particularly rigid anti-roll mechanism, such as race cars, a suspension design commonly referred to as a monoshock design has been developed. The monoshock design uses "push-pull" rods to link the outer ends of the lower suspension tables of the vehicles to a common rocker assembly in the transverse axis which is fixed to the chassis. The pivoting action is limited by a mechanism comprising a spring and damper element.

This type of arrangement provides for very rigid anti-roll characteristics. Indeed, when one of the wheels is forced upwardly, the upward movement is transferred integrally to the opposite wheel. In order to allow a wheel to be individually raised, when for example going over small bumps, a mechanical means is used to allow lateral movement of the rocker assembly. The lateral movement of the rocker assembly is generally limited by some springing action and positive stops. Performance of suspension system using the so-called monoshock design on relatively smooth tracks has proven to be efficient. However, rough tracks create various instability problems. Indeed, whenever a given wheel is raised by a bump in excess of the lateral travel of the rocker assembly, the raising of the opposite wheel creates a sudden overall loss of adhesion.

OBJECTS OF THE INVENTION

An object of the present invention is therefore to provide an improved vehicle suspension.

SUMMARY OF THE INVENTION

More specifically, in accordance with the present invention, there is provided a suspension system for controlling the relative displacement between a pair of laterally opposed ground engaging assemblies of a vehicle and a longitudinal frame of the vehicle, the suspension system comprising:

a first suspension member;

means for mounting the first suspension member to the frame while allowing the first suspension member and the frame to pivot relatively to one another about a first pivotal axis substantially transversal to the frame;

a second suspension member;

means for mounting the second suspension member to the first suspension member while allowing the first suspension member and the second suspension member to pivot relatively to one another about a second pivotal axis, the second pivotal axis being substantially perpendicular to the first pivotal axis;

a biasing assembly swingably mounted between the frame and the second suspension member for biasing the second suspension member towards a predetermined position;

a pair of elongated motion transmitting members, each the suspension member having a distal end swingably mounted to one of the laterally opposed ground engaging assembly, and a proximate end swingably mounted to the second suspension member; wherein the relative displacement between the pair of laterally opposed ground assemblies and the longitudinal frame of the vehicle is transferred to the biasing assembly by the elongated motion transmitting members and the second suspension members to thereby enable the biasing assembly to control the relative displacement.

According to another aspect of the present invention, there is provided a suspension system for controlling the relative displacement between a pair of laterally opposed ground engaging assemblies of a vehicle and a frame of the vehicle, the suspension system comprising:

a base member;

a suspension member pivotally mounted to the base member;

a biasing arrangement mounted between the base member and the suspension member for biasing the suspension member towards a predetermined position;

a pair of elongated motion transmitting members, each the motion transmitting member having a distal end swingably mounted to one of the laterally opposed ground engaging assembly, and a proximate end coupled to the suspension member; wherein the relative displacement between the pair of laterally opposed ground assemblies and the longitudinal frame of the vehicle is transferred to the suspension member by the elongated motion transmitting members to thereby enable the suspension member to control the relative displacement between the pair of laterally opposed ground engaging assemblies of the vehicle and the frame of the vehicle.

Advantages of the present invention include the partial or total elimination of conventional anti-roll devices such as torsion bars or the like. Consequently, whenever a given ground engaging component is individually raised relatively to the frame of the vehicle, the laterally opposed ground engaging component is not initially raised off the ground surface. In fact, with a suspension system in accordance with the present invention, the raising of a given ground engaging component relatively to the frame causes the laterally opposed ground engaging component to be initially biased downwardly, against the ground surface, therefore improving the contact between the ground engaging component and the ground surface.

Another advantage of the present invention lies in the fact that the suspension system in accordance with the present invention transfers less lateral forces to the frame of the vehicle, which, in turn, induces less frame roll.

A further advantage of the invention is that the suspension system will adapt itself to various situations as it will become stiffer as it is solicitated. For example, when used on racing cars having down force creating components, the suspension system will allow a softer ride and better tire compliance at low speeds such as in slow turns and a much higher resistance to roll at higher turning speeds.

A still further advantage of the suspension system in accordance with the present invention is that the suspension system will provide improved handling characteristics, for example when installed to performances vehicles such as race cars.

Other objects, advantages and features of the present invention will become more apparent upon reading of the following non restrictive description of preferred embodiments thereof, given by way of example only with reference to the accompanying drawings.

DETAILED DESCRIPTION OF THE PREFERRED EMBODIMENTS

Figure 1:
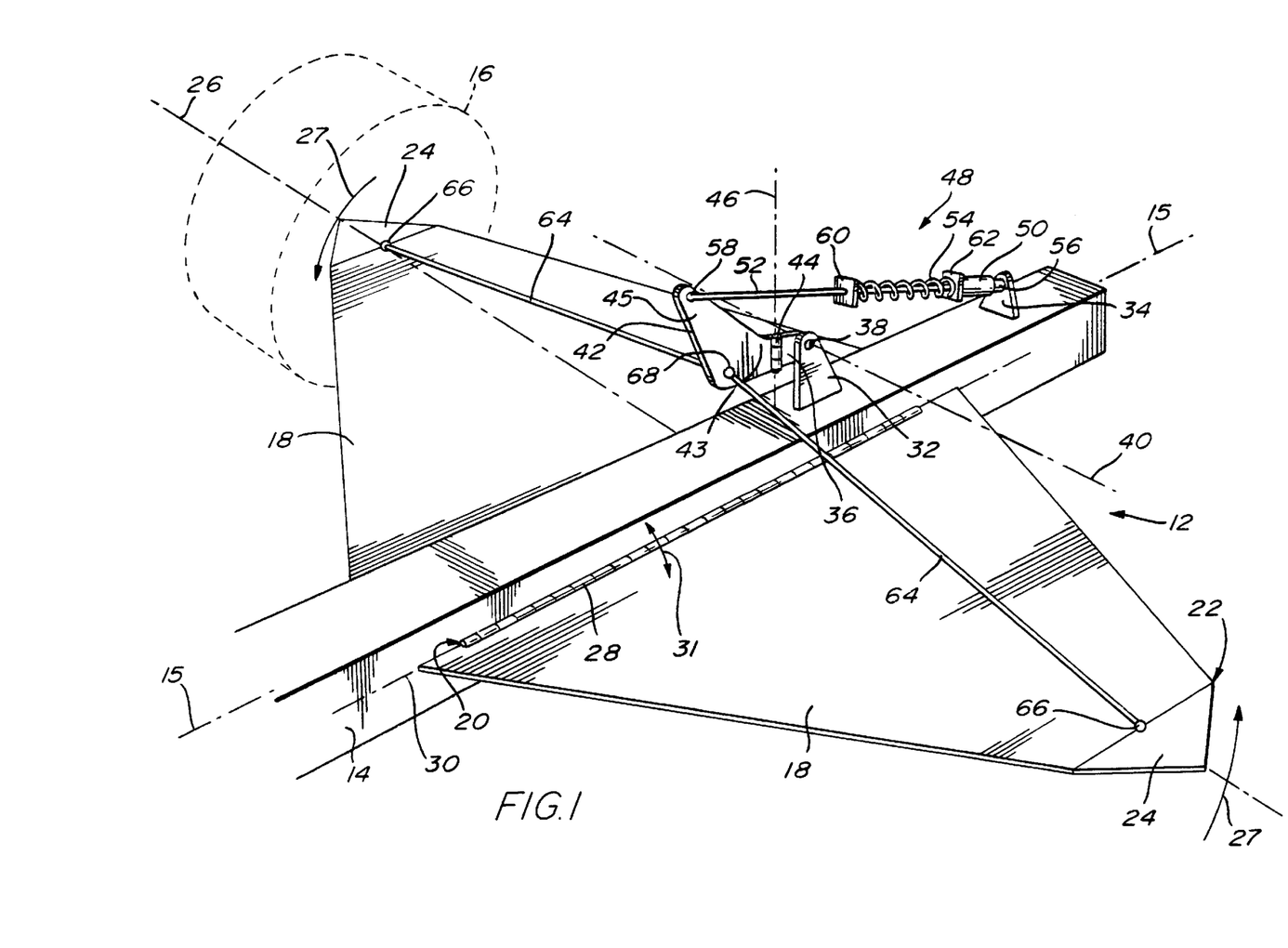
FIG. 1 is a perspective view illustrating a schematic representation of a suspension system in accordance with a first embodiment of the invention mounted on a schematized vehicle frame, the suspension system being shown in an unloaded configuration.

Referring to FIG. 1, there is shown a schematic representation of a vehicle suspension system 10 in accordance with a first embodiment of the present invention. The suspension system 10 is shown mounted adjacent a rear section of a schematic vehicle 12. The vehicle 12 has a generally elongated frame 14 extending along a longitudinal axis 15.

A pair of opposed ground engaging components such as lateral wheels 16 (only one shown in FIG. 1) are hingedly connected to the frame 14 by a corresponding pair of wheel-to-frame linking components schematized in the drawings by a pair of suspension tables 18 to form a pair of schematized ground engaging assemblies. Each suspension table 18 has an inner end 20 and an outer end 22. Each suspension table 18 has a table-to-wheel connecting element 24 positioned adjacent its outer end 22 for rotatably connecting one of the wheels 16 to a corresponding suspension table 18.

The table-to-wheel connecting elements 24 allow rotation of the wheels 16 about a wheel rotational axis 26. The rotation of the wheels 16 is schematically indicated by the arrows 27. Each suspension table 18 individually has a table-to-frame connecting element 28 for hingedly connecting the inner ends 20 of the suspension tables 18 to the frame 14. The table-to-frame connecting elements 28 individually allow a suspension table 18 and the frame 14 to pivotally move relatively to one another about a table-to-frame pivotal axis 30 which extends substantially longitudinally along the frame 14. The relative pivotal movement between the suspension tables 18 and the frame 14 are schematized by arrow 31.

It should be understood that the suspension tables 18 herein described are schematized representations of a pivotal link between the frame 14 and the wheels 16 of the vehicle 12. Any suitable rigid linking component allowing transmission of the pivotal movement of the wheels 16 relatively to the frame 14 such as conventional suspension arms or superposed suspension table arrangements could be used without departing from the scope of the present invention. Also, the wheels 16 are schematized representations of ground engaging components. Any other type of ground engaging component such as skis, track, or the like could be used without departing from the scope of the present invention.

The vehicle 12 also has a first spacing component 32 and a second spacing component 34. The first spacing component 32 and the second spacing component 34 both extend outwardly from the frame 14. The first spacing component 32 and the second spacing component 34 are substantially centrally located relatively to the lateral peripheral edges of the frame 14. The first spacing component 32 and the second spacing component 34 are substantially aligned along the longitudinal axis 15 and are spaced longitudinally from each other.

The suspension system 10 includes a first suspension member 36 which is pivotally attached to the first spacing component 32 by a first pivotal mounting arrangement schematized by a pivoting pin 38 extending through both the first spacing component 32 and the first suspension member 36.

The pivoting pin 38 solidly attaches the first suspension member 36 to the first spacing component 32 while allowing a relative pivotal movement between the first suspension member 36 and the first spacing component 32 about a first pivotal axis 40. The first pivotal axis 40 extends substantially perpendicularly to the longitudinal axis 15 of the frame 14.

Typically, the longitudinal axis 15 and the first pivotal axis 40 both extend in a direction which is substantially parallel to the ground surface on which the wheels 16 are supported when the vehicle 12 is in use. The first pivotal axis 40 is thus substantially transversally oriented relatively to the frame 14.

A second suspension member 42 is pivotally attached to the first suspension member 36 by a second pivotal mounting arrangement schematized by a hinge-type connection 44. The hinge-type connection 44 solidly attaches the second suspension member 42 to the first suspension member 36 while allowing a relative pivotal movement between the second suspension member 42 and the first suspension member 36 about a second pivotal axis 46.

The second pivotal axis 46 extends in a direction which is substantially perpendicular to the first pivotal axis 40. The second pivotal axis 46 is spaced from the first pivotal axis 40, in the direction of the axis 15, by a first member spacing distance indicated in FIGS. 2 and 5 by the reference D1.

The second suspension member 42 is configured and sized so that a segment of the latter will be off-centered relatively to the first pivotal axis 40 in a direction parallel to the second pivotal axis 46. In one embodiment, the second suspension member 42 has a substantially V-shaped configuration defining a pair of rigidly connected diverging segments 43 and 45.

A biasing arrangement 48 extends between the second suspension member 42 and the second spacing component 34. The biasing arrangement 48 typically comprises a suspension damper 50, a piston rod 52 slidably inserted into the suspension damper 50 and a helicoidal suspension spring 54. The biasing arrangement 48 is substantially centrally located relatively to the transversal peripheral edges of the frame 14. It should be understood that other types of suitable biasing arrangements such as hydraulic or pneumatic actuators and dampers, torsion bars or other similar biasing arrangements could be used without departing from the scope of the present invention.

The suspension damper 50 is swingably mounted to the second spacing component 34 by universal-type joint such as a damper ball-and-socket joint 56. Similarly, the piston rod 52 is swingably mounted to the second suspension member 42 by a universal-type joint such as a rod ball-and-socket joint 58. The suspension spring 54 abuts at one of its longitudinal ends against a rod plate 60 fixedly mounted to the piston rod 52. The suspension spring 54 abuts at its other longitudinal end against a damper plate 62 fixedly mounted to the suspension damper 50.

A pair of "push-pull" type of motion transmitting rods 64 extends between the second suspension member 42 and the suspension tables 18. The motion transmitting rods 64 are typically obliquely and symmetrically disposed relatively to the longitudinal axis 15. Each motion transmitting rod 64 is fixed at one of its longitudinal ends to a suspension table 18, preferably adjacent to the outer end 22 thereof. Each motion transmitting rod 64 is swingably mounted to a corresponding suspension table 18 by a universal-type joint such as a ball-and-socket joint 66. The other longitudinal end of each motion transmitting rod 64 is swingably mounted to the second suspension member 42, preferably adjacent the intersection of the segments 43 and 45 thereof, by a universal-type joint such as a ball-and-socket joint 68.

Figure 2:
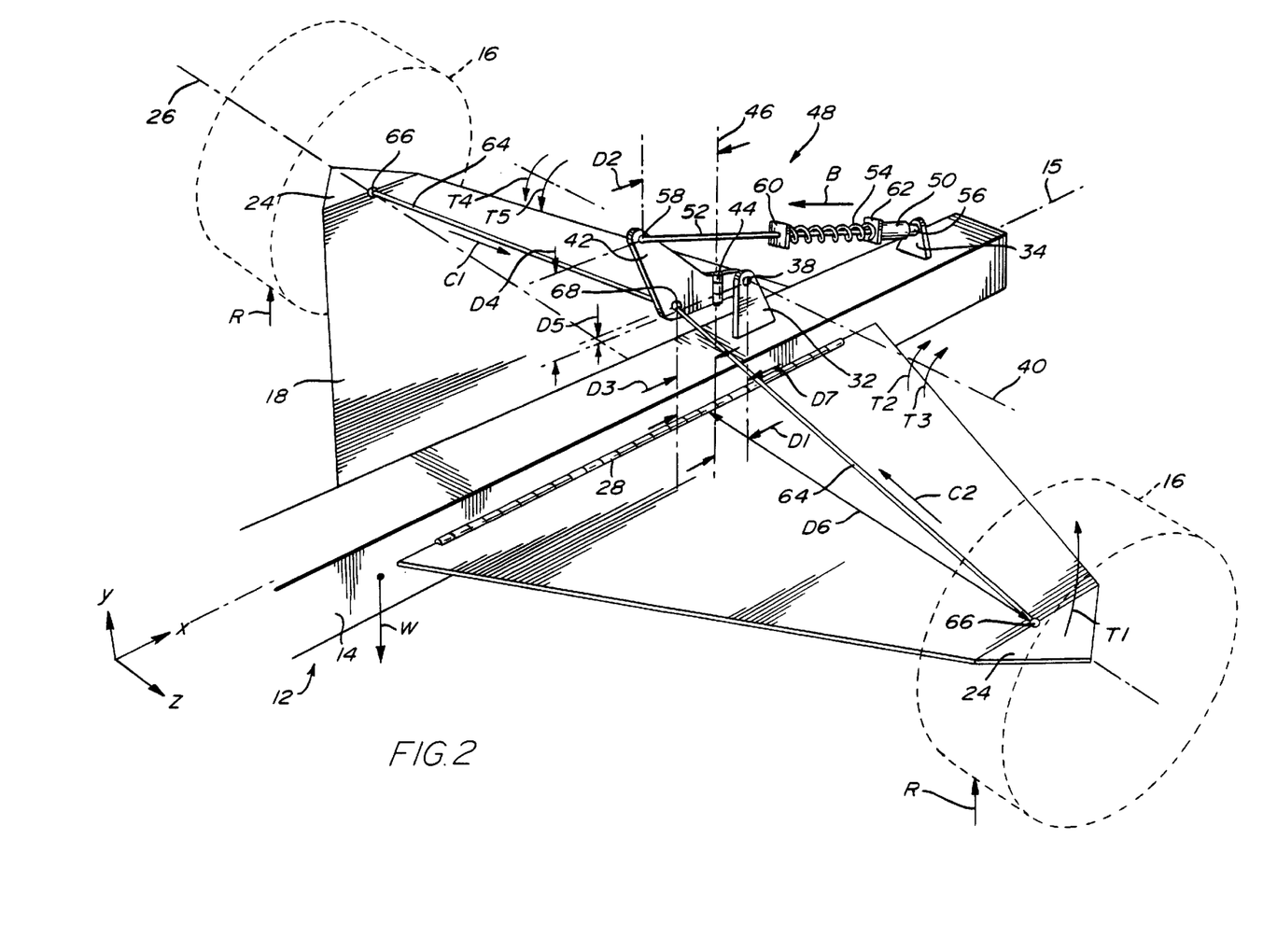
FIG. 2 shows a perspective view of the suspension system of FIG. 1 in a symmetrically loaded configuration.
Figure 5:
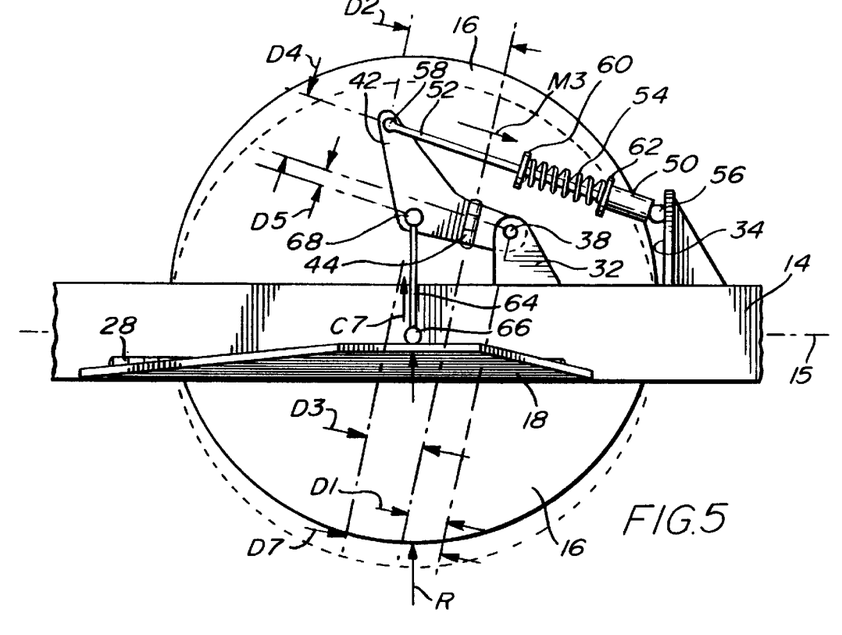
FIG. 5 shows a side elevational view of the suspension system of FIG. 1 where one of the wheels to which it is attached is raised.

As illustrated more specifically in FIGS. 2 and 5, the rod ball-and-socket joint 58 is spaced from the first pivotal axis 46, in the direction of the 15 axis, by a distance D2. The ball-and-socket joint 68 is spaced from the second pivotal axis 46, in the direction of the axis 15, by a first transmitting rod joint spacing distance D3. In the preferred embodiment, the second suspension member 42 is configured so that the distance D2 is greater than the distance D3.

The rod ball-and-socket joint 58 is spaced from the first pivotal axis 40, in the direction of the second pivotal axis 46 axis, by a distance D4. The ball-and-socket joint 68 is spaced from the first pivotal axis 40, in the direction of the second pivotal axis 46, by a distance D5. In the preferred embodiment, the second suspension member 42 is configured so that the distance D4 is greater than the distance D5.

The pivoting pin 38, the ball and socket joint 68 and the ball and socket joint 58 therefore form an obtuse angle where the ball-and-socket joint 68 is the vertex.

The reactions of the suspension system 10 in various operating conditions will hereinafter be discussed with reference to FIGS. 2 through 6. In order to facilitate the description of the various forces involved and of the movements generated by these forces, a Cartesian coordinate system will be used. In this Cartesian coordinate system, a first coordinate axis X extends in a direction parallel to the reference axis 15. A second coordinate axis Y extends in a direction parallel to the second pivotal axis 46 while a third coordinate axis Z extends in a direction parallel to the first pivotal axis 40.

FIG. 2 illustrates a situation where the vehicle 12 is immobile on a relatively flat and horizontal ground surface. The only forces acting on the vehicle 12 are the weight of the vehicle 12 schematized by the arrow W, the ground reactive forces schematized by the arrows R and a biasing force B produced by the suspension spring 54. Since the ground surface is substantially horizontal, the direction of the weight force W and of the reactive forces R are oriented substantially perpendicularly to the latter. Furthermore, since the ground surface is flat and the suspension system 10 is symmetrical relatively to the longitudinal axis 15, the biasing arrangement 48 is in a substantially symmetrical relationship with the lateral peripheral edges of the frame 14.

The reactive forces R are transmitted to the suspension tables 18 by the table-to-wheel connecting elements 24. The forces transmitted to the suspension tables 18 tend to create a torque TI which is proportional to both the magnitude of the ground reactive forces R and a distance D6, in the direction of the Z axis, between one of the table-to-frame connecting elements 28 and a proximal table-to-wheel connecting element 24.

The ground reactive forces R are transmitted to the second suspension member 42 by the motion transmitting rods 64. One of the main features of the present invention resides in the fact that when a force tending to raise one of the suspension tables 18 is applied to the latter, the force is instantaneously transmitted to the other suspension table 18 by the motion transmitting rods 64.

Indeed, since the motion transmitting rods 64 are both attached to the second suspension member 42 and since the latter is allowed to pivot freely about the second pivotal axis 46, the force applied to one suspension table 18 is automatically applied to the other suspension table 18.

The motion transmitting rods 64 typically have a three-dimensional oblique orientation relatively to the previously defined Cartesian coordinate system. The compressive forces generated in each of the motion transmitting rods 64 are respectively identified by the reference characters C1 and C2. As mentioned previously, the motion transmitting rods 64 are symmetrically disposed relatively to the longitudinal axis 15. Consequently, if the ground reactive forces R have substantially the same magnitude, the component of the compressive forces C1 and C2 in the direction of the Z axis cancel each other.

The components of the compressive forces C1 and C2 in the direction of the Y axis both create a torque T2 which tends to rotate the first suspension member 36 about the first pivotal axis 40. Since both table-to-wheel connecting elements 24 are located below the suspension system 10, the components of the compressive forces C1 and C2 both tend to rotate the first suspension member 36 in the same direction. The torque T2 is proportional to the vectorial sum of the components in the direction of the Y axis of the compressive forces C1 and C2 and to a distance D7, in the direction of the X axis, between the ball-and-socket joint 68 and the first pivotal axis 40.

The components of the compressive forces C1 and C2 in the direction of the X axis both create a torque T3 which also tends to rotate the first suspension member 36 about the first pivotal axis 40. The torque T3 is proportional to the vectorial sum of the components in the direction of the X axis of the compressive forces C1 and C2 and to a distance D5, in the direction of the Y axis, between the ball-and-socket joint 68 and the first pivotal axis 40.

The torques T2 and T3, generated by the compressive forces C1 and C2, are nullified by the vectorial sum of a pair of torques T4 and T5 generated by the biasing force B generated by the suspension spring 54 and transferred to the second suspension member 42 by the piston rod 52 at the ball-and-socket joint 58. The component of the biasing force B in the direction of the X axis creates a torque T4 which tends to rotate the first suspension member 36 about the first pivotal axis 40 in a direction opposite the rotation created by the torque T3. The torque T4 is proportional to the component in the direction of the X axis of the biasing force B and to the distance D4.

The component of the biasing force B in the direction of the Y axis creates a torque T5 which tends to rotate the first suspension member 36 about the first pivotal axis 40 in a direction opposite the rotation created by the torque T2. The torque T5 is proportional to the component in the direction of the Y axis of the biasing force B and to the distance D2.

The weight W of the vehicle 12 thus creates a set of opposed reaction forces R applied on the wheels 16. The wheels 16 transfer these forces to the suspension platforms 18 which, in turn, generate substantially equal compressive forces C1 and C2 in the motion transmitting rods 64. The latter being symmetrically disposed relatively to the Z axis, the Z axis components of the forces C1 and C2 nullify each other. However, the X and Y axis components of the forces C1 and C2 generate respectively a pair of torques T2 and T3 which tend to rotated the suspension system 10 about the first pivotal axis 40.

The suspension system 10 is prevented from rotating about the first pivotal axis 40 by the biasing force B which also has an X axis and a Y axis component. The biasing force B generates a pair of torques T4 and T5, the vectorial sum of which equilibrates the torques T2 and T3. When the vehicle 12 is immobile on a relatively flat and horizontal surface, the suspension spring 54 which is adapted to support the weight W of the vehicle 14 is thus partially compressed from an uncompressed configuration to a configuration hereinafter referred to as a spring initial configuration.

Figure 3:
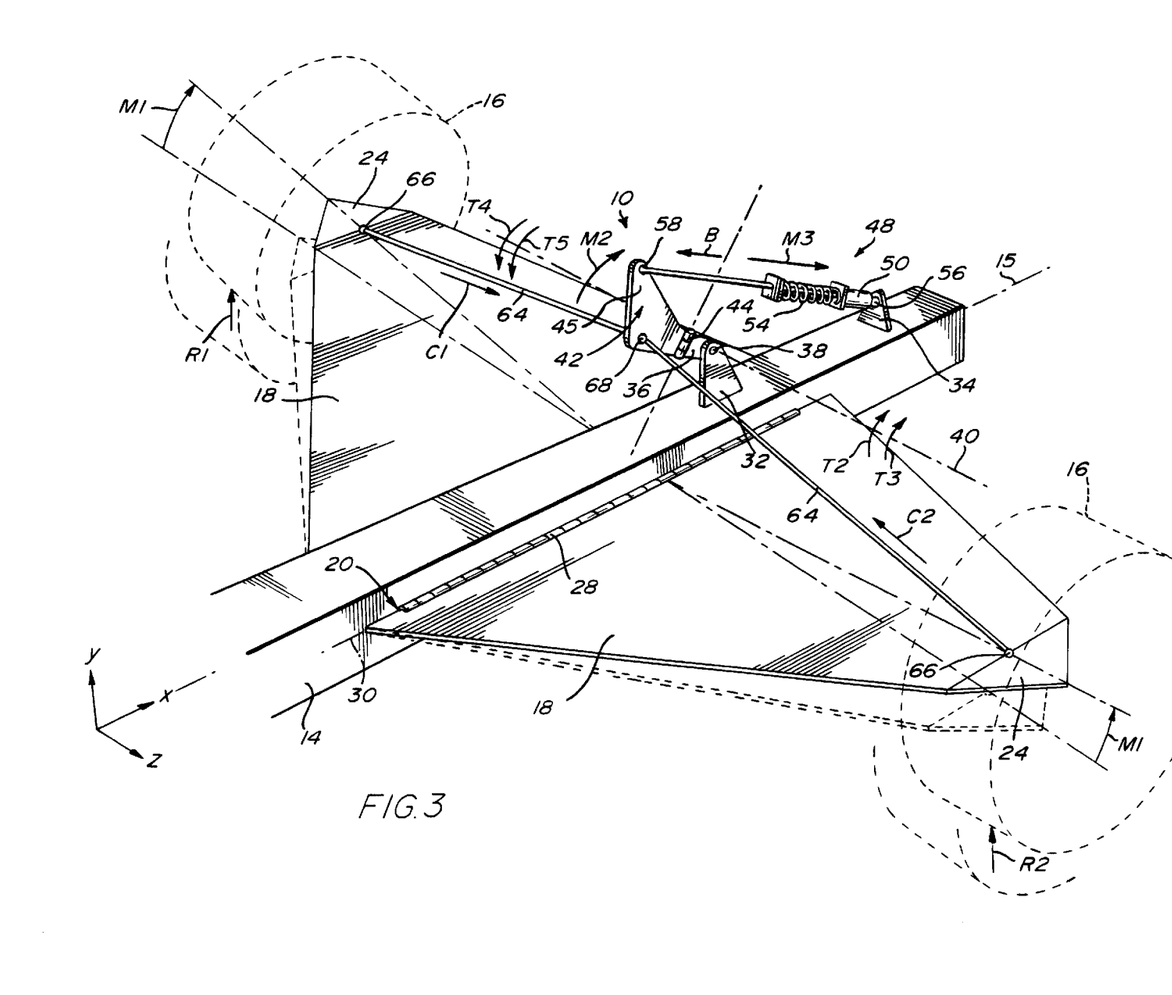
FIG. 3 shows a perspective view of the suspension system of FIG. 1 where both wheels to which it is attached are raised symmetrically.

FIG. 3 illustrates a situation wherein both of the suspension tables 18 are pivoted about their respective table-to-frame pivotal axis 30 by the same angular displacement M1. This type of situation occurs for example when both wheels 16 roll simultaneously over the same road bump or additional weight is loaded onto the frame 14 of the vehicle 12 symmetrically along the longitudinal axis 15.

In such instances, the reactive forces R are suddenly increased in magnitude. The increase in the reactive forces R is transmitted via the wheels 16, the table-to-wheel connecting elements 24 and the suspension tables 18 to the motion transmitting rods 64. The increase in the reactive forces R will thus cause the compressive forces C1 and C2 to also increase in magnitude. Since the motion transmitting rods 64 and the biasing arrangement 48 both remain symmetrically disposed relatively to the X axis, the components of the compressive forces C1 and C2 along the Z axis will again nullify each other and the biasing force B will again only generate components along the X and Y axis.

In fact, the situation is quite similar to the situation illustrated in FIG. 2 except that the torques T2 and T3 are temporarily increased, causing the first suspension member 36 to temporarily rotate about the first member pivoting axis 40. The angular displacement of the first suspension member 36 about the first member pivoting axis 40 is indicated by the reference M2. The angular displacement of the first suspension member 36 about the first pivoting axis 40 causes a translational displacement M3 of the piston rod 52 inside the suspension damper 50 and the suspension spring 54 to be temporarily compressed relatively to its initial spring configuration.

The compression of the suspension spring 54 will generate an increase in the magnitude of the biasing force B. The increase in the magnitude of the biasing force B is proportional to the amount of compression of the suspension spring 54 and to the specific characteristics of the suspension spring 54 and the suspension damper 50. Ultimately, the increase in the reactive forces R will be transmitted to the frame 14, causing an upward impulse of the latter. The magnitude of the impulse on the frame 14 depends on the specific characteristics of the suspension spring 54 and the suspension damper 50.

As mentioned previously, one of the main characteristics of the present invention is that the behaviour of the suspension system 10 will differ substantially from the behaviour of conventional suspension systems in situations wherein the pivotal displacement of one of the suspension table 18 relatively to the frame 14 is different from the pivotal displacement of the other suspension table 18 relatively to the frame 14.

Figure 4:
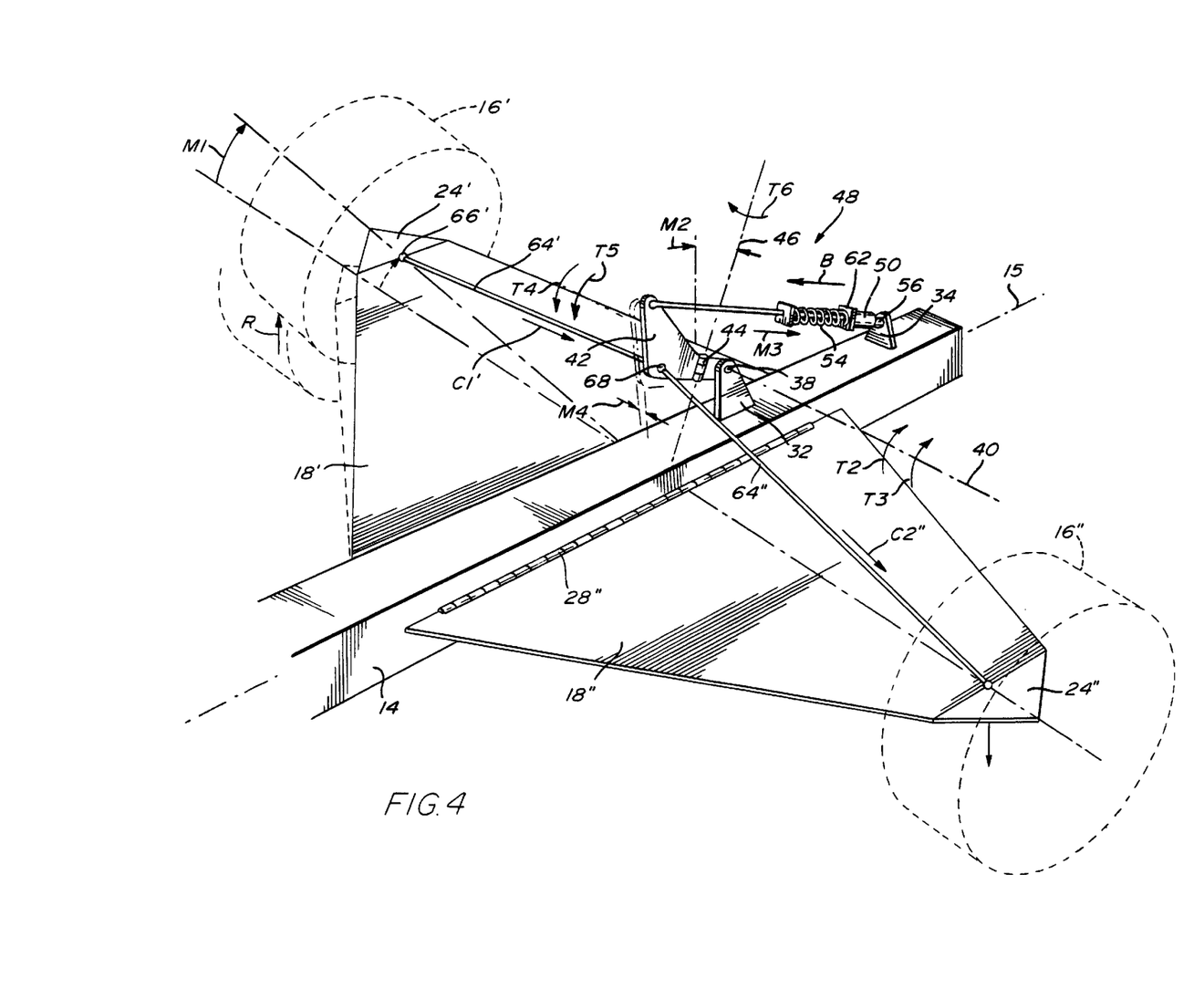
FIG. 4 shows a perspective view of the suspension system of FIG. 1 where one of the wheels to which it is attached is raised while the other wheel remains on the ground surface.

This type of situation occurs for example when only one of the wheels 16 strikes a road bump. FIG. 4 schematically illustrates the relative movements of the various components of the suspension system 10 in a situation wherein one of the wheels, denoted 16' in this Figure, strikes a road bump while the opposed wheel, denoted 16", remains on a relatively flat surface. In order to facilitate comprehension of FIG. 4, the reference characters appearing on one side of the longitudinal axis 15 are marked with a prime symbol while the reference characters appearing on the opposite side of the longitudinal axis 15 are marked with a double prime symbol.

Upon the wheel 16' impacting a road bump, the compression force C1' in the motion transmitting rod 64' will be substantially instantaneously increased. Since the motion transmitting rods 64' and 64" are both attached to the second suspension member 42 and since the latter is allowed to pivot freely about the second pivotal axis 46, the increase in the compression force C1' will be substantially instantaneously transferred to the motion transmitting rod 64".

Indeed, since the wheel 16" is abuttingly resting on the ground surface, the increase in the compression force C1' will substantially instantaneously generate an increase in the compression force C2" present in the motion transmitting rod 64". The increase in the compression force C2" is of substantially the same magnitude as the increase in the compression force C1'.

The components of the compression forces C1' and C2" along the Y and X axis will again generate corresponding torques T2 and T3 tending to rotate the first suspension member 36 about the first pivotal axis 40. The angular displacement of the first suspension member 36 about the first member pivoting axis 40 is indicated by the reference M2. The angular displacement M2 of the first suspension member 36 about the first pivoting axis 40 causes a translational displacement M3 of the piston rod 52 inside the suspension damper 50 and the suspension spring 54 to be temporarily compressed relatively to its initial spring configuration.

Ultimately, the striking of the wheel 16' on the road bump will be transmitted to the first spacing component 32 and to the frame 14, causing an upward impulse of the latter. The magnitude of the impulse on the frame 14 depends on various specific characteristics such as the suspension spring rate, the suspension damper rate and the specific geometrical arrangement of the various components making up the suspension system 10.

When the difference between the pivotal displacement of the suspension tables 18' and 18" transmitted by the motion transmitting rods 64 to the second suspension member 42 reaches a predetermined value, the latter will be forced to pivot about the second pivotal axis 46. The angular displacement of the second suspension member 42 about the second pivotal axis 46 is denoted in FIG. 4 by the reference M4.

The angular displacement M4 of the second suspension member 42 about the second pivotal axis 46 also causes a translational displacement of the piston rod 52, a compression of the suspension spring 54 and consequently an increase in the magnitude of the biasing force B.

Figure 6:
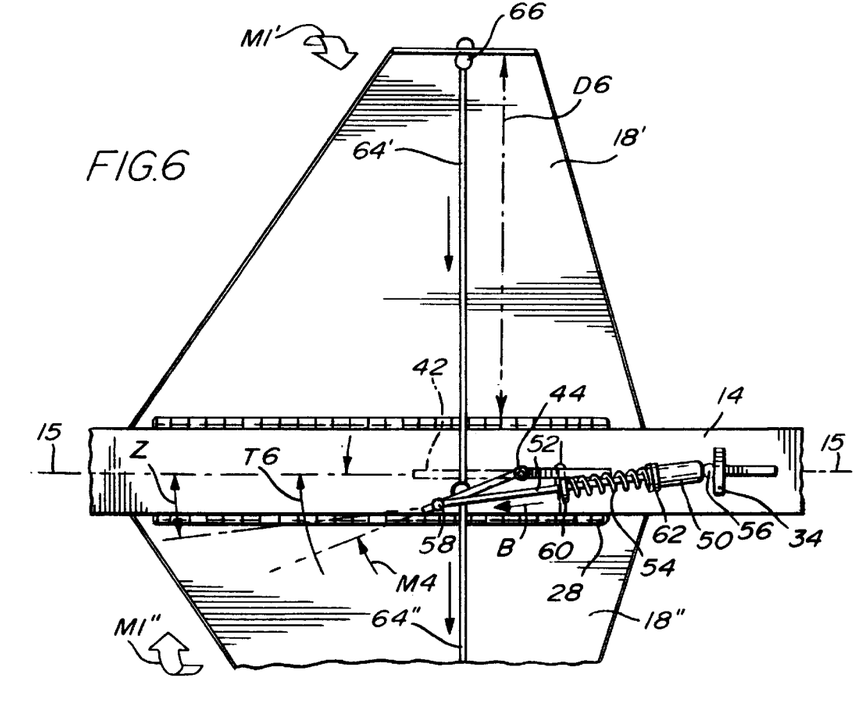
FIG. 6 shows a partial top plan view of the suspension system of FIG. 1 where the schematized vehicle frame to which the suspension is mounted is in a roll situation, i.e. when the tables are moved, in relation to the frame, of an essentially equal amplitude but in opposite direction.

FIG. 6 illustrates a partial top plan view of the suspension system of FIG. 1 where the schematized vehicle frame 14 to which the suspension 10 is mounted is in a roll situation, i.e. when the tables 18' and 18" are moved, in relation to the frame 14, of an essentially equal amplitude but in opposite direction as illustrated by arrows M1' and M1", respectively. The situation of FIG. 6 happens when the vehicle 12 is subjected to a lateral acceleration, for example, when negotiating a bend.

As will be easily understood by one skilled in the art, the situations illustrated in FIGS. 4 and 6 are similar with respect to the attitude of the suspension 10.

In instances such as the one illustrated in FIGS. 4 and 6, the second suspension member 42 pivots about the second pivotal axis 46. The increase in the biasing force B is thus caused both by the angular displacement M4 of the second suspension member 42 about the second pivotal axis 46 and the angular displacement M2 of the first suspension member 36 about the first member pivoting axis 40. More specifically, the displacement of the biasing force B from its initial position along the longitudinal axis 15 creates a moment or force that tends to bring the second suspension member 42 in its initial position.

The biasing force B pushes on the second suspension member 42 via the piston rod 52 and generates a torque T6 which tends to rotate the second suspension member 42 about the back towards its initial position illustrated in dashed lines in FIGS. 4 and 6. The torque T6 is generated by the components of the biasing force B applied on the second suspension member 42 and which extend in a direction perpendicular to the second pivotal axis 46.

The specific geometrical configuration of the suspension system 10 allows for the torque T6 to generate a so-called self-centering effect. The self-centering effect is such that the torque T6 always tends to pivot the second suspension member 42 towards a position wherein the biasing arrangement 48 to which it is attached is substantially symmetrically disposed relatively to the longitudinal axis 15 of the frame 14.

Furthermore, the so-called self-centering effect has a rising rate type of property. Indeed, the more the second suspension member 42 is pivoted about the second pivoting axis 46, away from its original centered position, the more the self-centering torque T6 will increase in magnitude as will be hereinafter be discussed.

When the suspension is in the position of FIG. 6, the biasing force B forms an angle Z relatively to its original position prior to the rotation of the second suspension member 42.

The increase in the magnitude of the torque T6 when the second suspension member 42 is pivoted about the second member axis 46, is imputable in part to the increase of angle Z. Indeed, as the angle Z is increased, the magnitude of the component of the biasing force B perpendicular to the second pivotal axis 46, which generates the self-centering torque T6, is increased.

The resistance of the biasing force B to the free pivotal movement of the second suspension member 42 about the second pivotal axis 46 constitutes an anti-roll effect which tends to limit the relative displacement of the frame 14 relatively to the wheels 16' and 16". For a given suspension system geometry, the increase of the anti-roll effect increases with the pivotal displacement M4. Small differences in the relative displacements of opposed suspension tables 18 will create a relatively small pivotal displacement M4 of the second suspension member 42 about the second pivotal axis 46. In turn, the small pivotal displacement M4 of the second suspension member 42 about the second pivotal axis 46 will only generate a very small self-centering torque T6 and consequently will also only generate a very weak resistance to the roll of the frame 14 about the longitudinal axis 15.

Conversely, larger differences in the relative displacements of opposed suspension tables 18 will create a larger pivotal displacement M4 of the second suspension member 42 about the second pivotal axis 46. In turn, the larger pivotal displacement M4 of the second suspension member 42 about the second pivotal axis 46 will generate a much stronger self-centering torque T6 and consequently will also generate a much stronger resistance to the roll of the frame 14 about the longitudinal axis 15.

Since the magnitude of the biasing force B is proportional to the compressive load applied on the spring 54, when the suspension system 10 is used on racing vehicle having devices adapted to generate aerodynamical downforces, the self-centering torque T6 will be increased with an increase in the vehicle speed. Indeed, the aerodynamical downforces will cause the ground reactive forces schematized by the arrows R and, consequently the biasing force B, to increase, resulting in a greater self-centering torque T6 for a given angle Z. Thus, the suspension system 10 will become somewhat stiffer in roll as the speed of the vehicle is increased. The suspension system 10 is therefore "reactive" to the added aerodynamic downforce. This characteristic represents yet another advantage over most conventional suspension systems since the suspension system stiffness will self-adapt to the speed of the vehicle.

The ratio between the spacing distances D2 and D3 (see FIG. 2) is one of many geometrical characteristics that will also influence the anti-roll behaviour of the suspension system 10. For example, by decreasing the distance D3 it is possible to increase both the angle Z and the self-centering torque T6 without modifying other parameters of the suspension 10. Similarly, by increasing the distance D2 both the angle Z and the self-centering torque T6 may be increased.

While FIGS. 1 through 6 illustrate schematically a first embodiment of a suspension system 10, according to the present invention, and the various forces and torques applied to the suspension system 10 in different situations, FIGS. 7 through 10 illustrate the configuration of second embodiment of a suspension 110 according to the present invention.

It is to be noted that similar numbers in FIGS. 7–10 and in FIGS. 1–6 refer to similar components.

Figure 7:
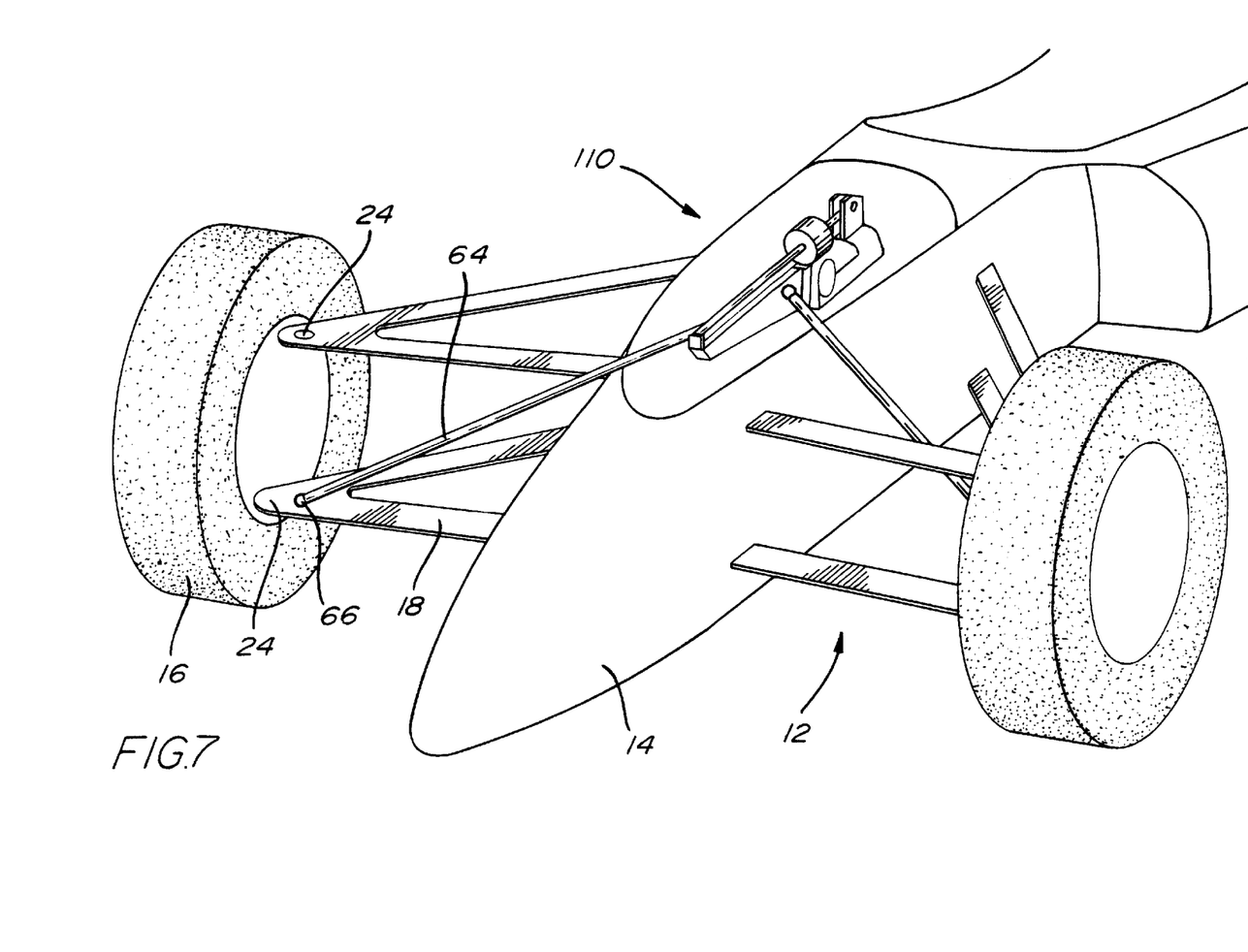
FIG. 7 shows a perspective view of a suspension system according to a second embodiment of the present invention in a symmetrically loaded configuration.
Figure 8:
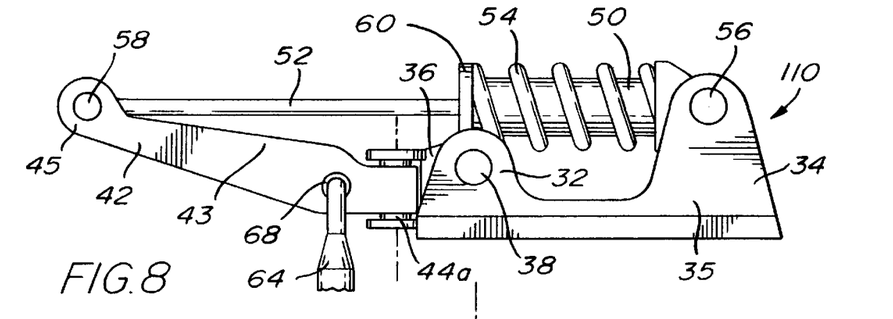
FIG. 8 shows a side elevational view of the suspension system of FIG. 7 in a symmetrically loaded configuration with sections taken out.
Figure 9:
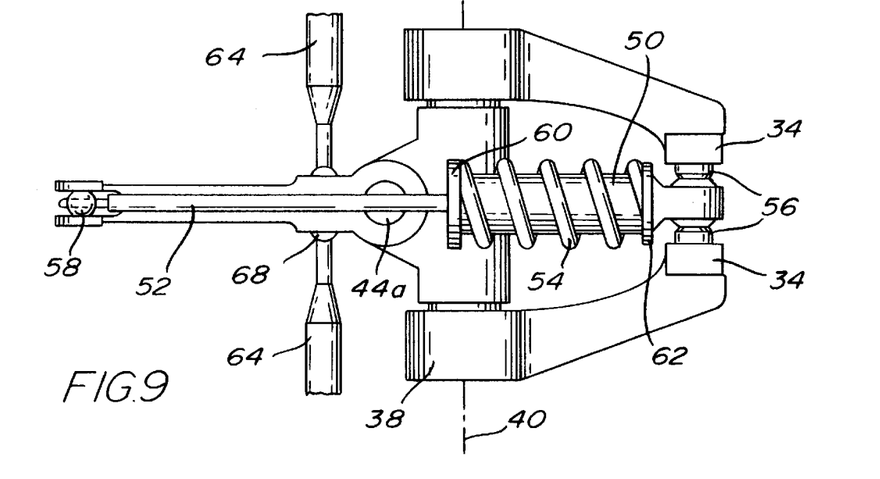
FIG. 9 shows a top plan view of the suspension system of FIG. 7 in a symmetrically loaded configuration with sections taken out.
Figure 10:
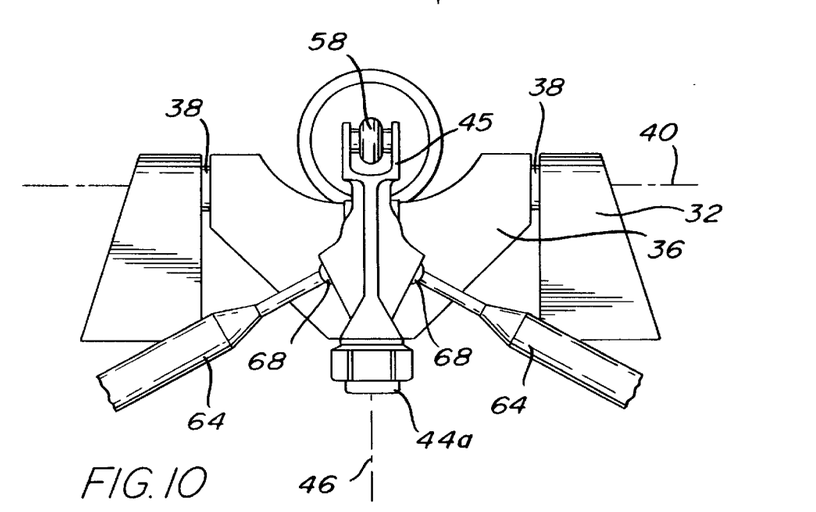
FIG. 10 shows a front elevational view of the suspension system of FIG. 7 in a symmetrically loaded configuration with sections taken out.

As illustrated in FIG. 7, each suspension table 18 preferably takes the form of a set of linkage arms assembled so as to form a pair of substantially "V"-shaped superposed assemblies. As illustrated in FIGS. 7 and 8, the first and second spacing components 32 and 34 are preferably formed out of an integral piece of material 35 with the first spacing component 32 having a substantially V-shaped configuration when seen in the direction of the x axis (see FIG. 10).

The first suspension member 36 is pivotally mounted to the first spacing component 32, between the arms of its V-shaped configuration, by a pivoting pin 38. The first suspension member 36 also defines a substantially V-shaped configuration. The second suspension member 42 is pivotally mounted to the first suspension member 36 through a pivoting pin 44a replacing the hinge-type connection 44 of FIGS. 1–6. The second suspension member 42 preferably has a substantially elongated configuration.

As will be easily understood by one skilled in the mechanical art, the suspension 110 of FIGS. 7–10 will react substantially in the same manner to the motions of the wheels 16 of the vehicle 12 to which it is mounted as described hereinabove with respect to suspension 10 of FIGS. 1–6.

Figure 11:
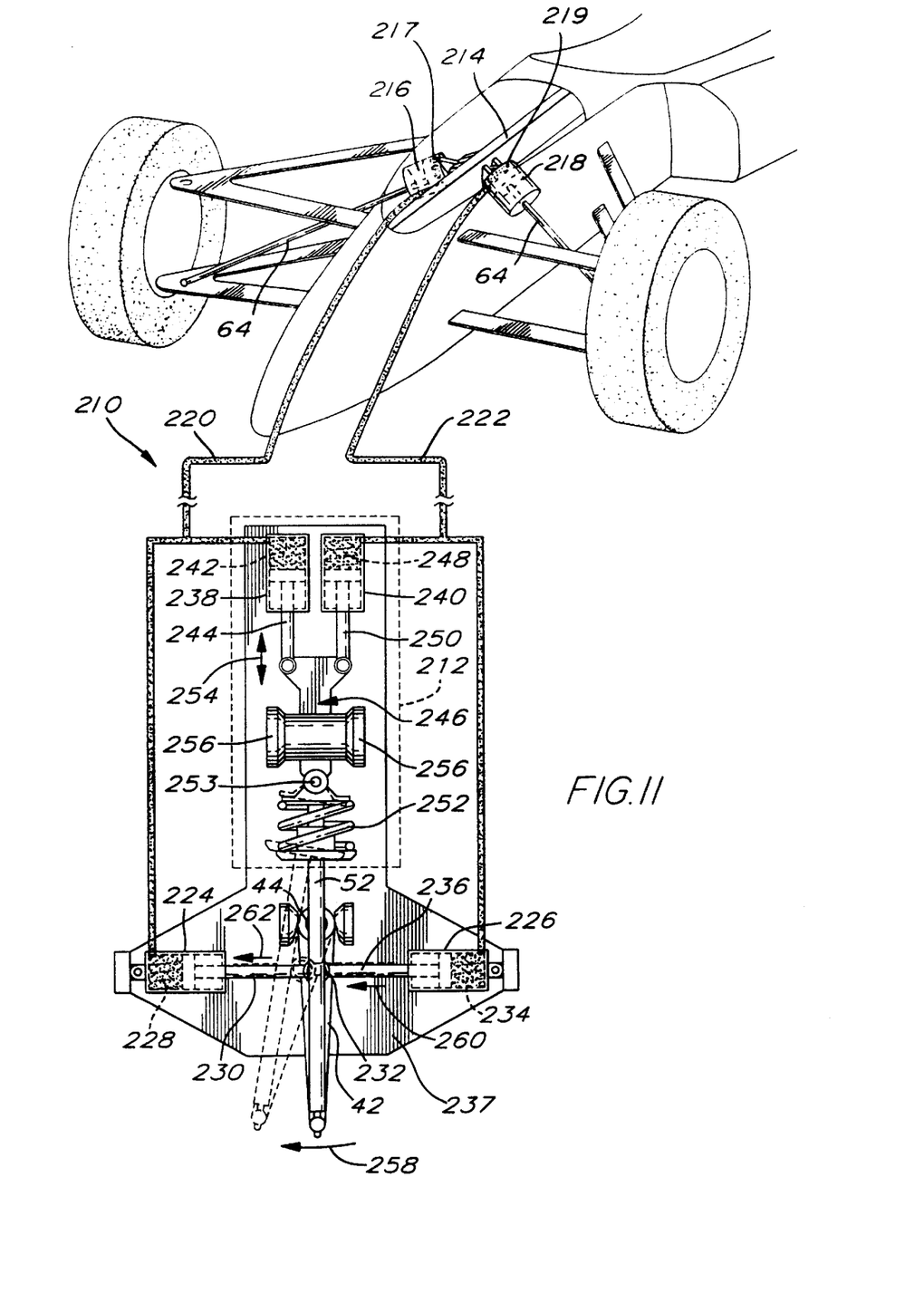
FIG. 11 shows a perspective view of a suspension system according to a third embodiment of the present invention in a symmetrically loaded configuration, in full lines, and in a roll situation, in dashed lines.

Turning now to FIG. 11, a suspension 210 according to a third embodiment of the present invention will be described.

As will be easily understood by one of ordinary skill in the art, the suspension 210 operates under the same general concept as described hereinabove with respect to suspensions 10 and 110. One difference between these suspensions is that, in suspension 210, the connection between the "push-pull" type of motion transmitting rods 64 and the second suspension member 42 is made via hydraulic fluid and not via a direct mechanical connection. Another difference is that the suspension 210 does not require that a first suspension member 36 (see FIG. 1, for example) be pivotally mounted to the second suspension member 42. The first suspension member 36 of the suspensions 10 and 110 is replaced by a heave control assembly 212 to control heave. By providing independent elements controlling the roll stiffness and the heave, it is possible to advantageously de-couple heave and roll stiffness.

As can be seen from FIG. 11, each motion transmitting rod 64 is connected to the frame 214 of the vehicle through a respective hydraulic actuator under the form of hydraulic cylinders 216, 218 provided with respective fluid chambers 217, 219. These cylinders 216, 218 are connected, via respective fluid conduits 220, 222, to the heave control assembly 212 and to a respective hydraulic cylinder 224, 226. The hydraulic cylinder 224 is provided with a fluid chamber 228 to which the fluid conduit 220 is connected and with a piston rod 230 connected to the second suspension member 42 via a pivot pin 232. Similarly, the hydraulic cylinder 226 is provided with a fluid chamber 234 to which the fluid conduit 222 is connected and with a piston rod 236 connected to the second suspension member 42 via the pivot pin 232. The hydraulic cylinders 224 and 226 are pivotally mounted to the frame 214 of the vehicle via a base member 237.

The heave control assembly 212 includes a pair of hydraulic cylinders 238, 240. The hydraulic cylinder 238 is provided with a fluid chamber 242 to which the fluid conduit 220 is connected and with a piston rod 244 connected to a heave member 246. Similarly, the hydraulic cylinder 240 is provided with a fluid chamber 248 to which the fluid conduit 222 is connected and with a piston rod 250 connected to the heave member 246.

The heave control assembly is also provided with a biasing arrangement generally consisting of a piston rod 52 and a helicoidal suspension spring 252.

The heave member 246 is connected to the piston rod 52 via the helicoidal suspension spring 252 and a pivot pin 253. The heave member 246 may slide longitudinally (see arrow 254) with respect to sliding guides 256 mounted to the frame 224.

As was briefly discussed hereinabove, the heave control assembly 212 is used to control the heave. It therefore has the same role as the first suspension member 36 and the pivot pin 38 coupled to the suspension damper 50 and helicoidal suspension spring 54 of suspensions 10 and 110.

FIG. 11 illustrates, in full lines, the suspension 210 in a symmetrically loaded configuration. In this configuration, the fluid pressure in the chambers 228 and 234 is essentially equal since this pressure is dictated by the fluid pressure in the fluid chambers 217 and 219 of hydraulic actuators 214 and 216, respectively. The second suspension member 42 is therefore centrally positioned.

It is to be noted that, should the pressure in the chambers 242 and 248 rise due to, for example, an equal pressure increase in the cylinders 214 and 216, the displacement of the heave member 246 will compress the suspension spring 252, leading to a pressure increase on the piston rod 52. The suspension system 210 will therefore become stiffer in heave. However, the second suspension member 42 will not move as a consequence of this pressure increase since the pressure in chambers 228 and 234 remains equal.

Also illustrated in dashed lines in FIG. 11, is the suspension 210 in a roll situation, i.e. when motion transmitting rods 64 are moved, in relation to the frame 214, of an essentially equal amplitude but in opposite direction. In the example illustrated, the fluid chamber 219 is compressed and the fluid chamber 217 is expanded. The fluid chamber 234 is therefore expanded, causing the displacement of the piston rod 236 (see arrow 260), and the volume of the fluid chamber 228 is therefore reduced, causing the displacement of the piston rod 230 (see arrow 262). The result of these displacements cause the pivotal movement of the second suspension member 42 (see arrow 258).

The piston rod 52 and the helicoidal suspension spring 252 will therefore become offset with the pivot pin 44 which creates a moment around the pivot 44. This moment will tend to bring the second suspension member 42 in its original position shown in full lines.

As will be easily understood by one of ordinary skill in the art, the roll stiffness of the suspension system 210 is function of the compressive load acting on rod 52 since this compressive load dictates the relative difficulty to pivot the second suspension member 42 about pivot pin 44. Also, this compressive load is proportional to the pressure fluid in chambers 242 and 248 and thus is dependent on the load applied to the ground engaging components, i.e the downforce.

It is to be noted that when a bump in the road exerts pressure on only one wheel of the vehicle, the second suspension member 42 will initially not move since the pressure increase in one of the cylinders 216, 218 is not counterbalanced by a pressure decrease in the other of the cylinders 216, 218. The pressure increase in one of the chambers 217, 219 will therefore cause a pressure increase in one of the chambers 242, 248 which will cause heave in proportion to the duration and amplitude of the bump and to the stiffness of spring 252 without initially causing the displacement of the second suspension member 42.

It is to be noted that it would be possible to restrict the movement around pivot 44 by using mechanical components such as torsion bars, springs or the like.

An advantage of the suspension 210 over suspensions 10 and 110 is that only the motion transmitting rods 64 and their attached cylinders 216 and 218 need to be positioned at predetermined positions in the vehicle, the other elements of the suspension 210 may be installed at any advantageous position in the vehicle since the only contacts between these elements and the cylinders 216 and 218 are made via fluid conduits 220 and 222 which may take many shapes.

Another advantage is that in a one wheel bump situation the suspension 210 will not induce roll since, at the moment one wheel is raised, the frame has not yet moved and the load on both sides is more or less equal. This is a major advantage over conventional suspension systems using anti-roll mechanism that cause uneven loading of laterally opposed wheels and consequently induce frame roll in these one wheel bump situations. The second suspension member 42 will only move if the pistons 230 and 236 move in the same direction, i.e. when the motion transmitting rods 64 move in opposite directions, as can be caused by sudden road camber changes and/or when lateral accelerations are developed.

Yet another advantage is that the adjustment and the damping of heave and roll stiffness may be done independently.

Another advantage is that, in the suspension system 210, the roll stiffness is proportional to the total load on a pair of ground engaging assemblies.

Figure 12:
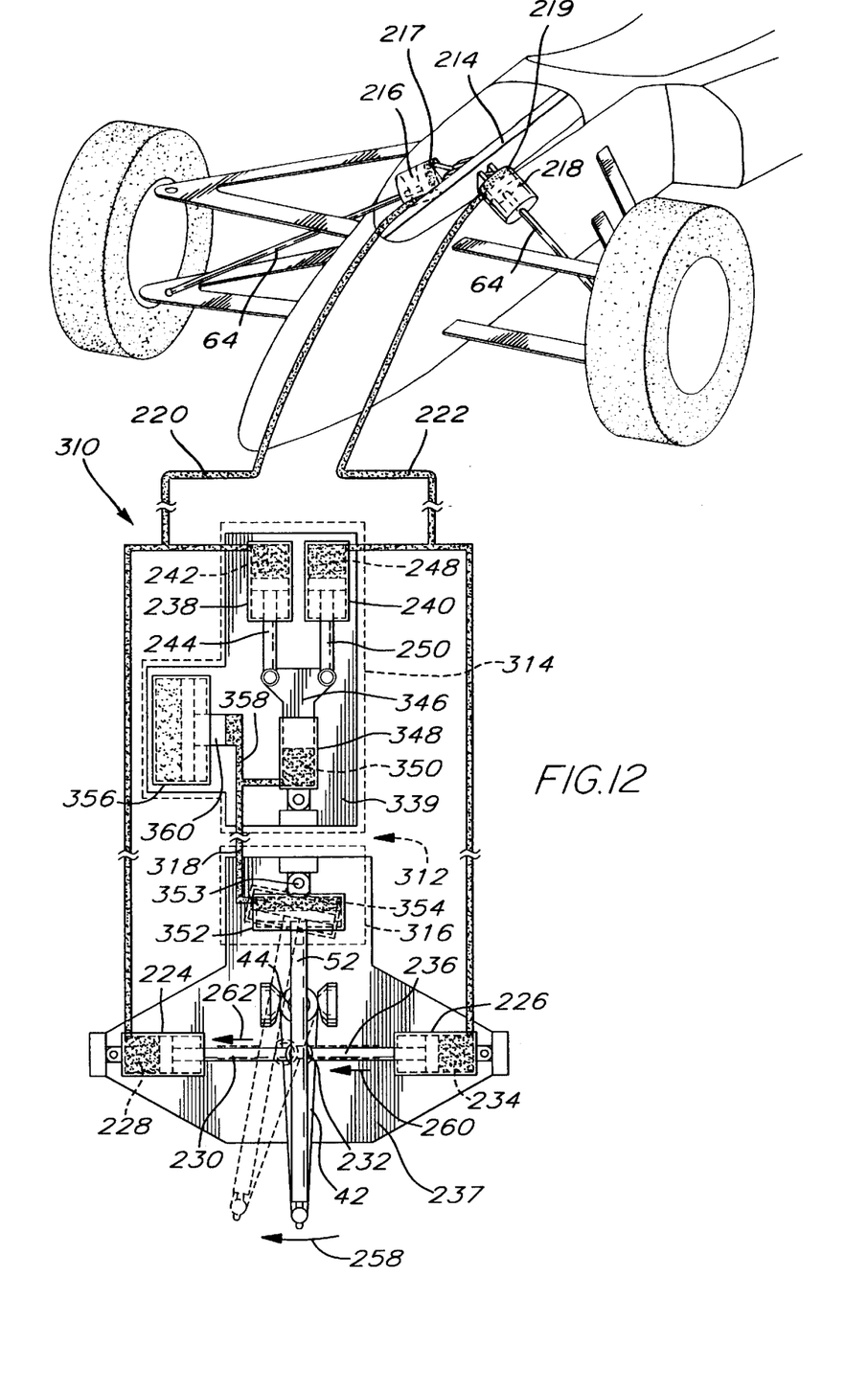
FIG. 12 shows a perspective view of a suspension system according to a fourth embodiment of the present invention in a symmetrically loaded configuration, in full lines, and in a roll situation, in dashed lines.

Turning now to FIG. 12 of the appended drawings, a suspension 310 according to a fourth embodiment of the present invention will be described.

One major difference between the suspension 310 of FIG. 12 and the suspension 210 of FIG. 11 is that the heave control assembly 212 of FIG. 11 is replaced by a heave control assembly 312 having two distinct portions 314, 316 interconnected by a fluid conduit 318. Accordingly, a second base member 339 is provided to support the heave control portion 314. An advantage of having a two portion heave control assembly 312 interconnected only by fluid conduits is that it is possible to position these portions at different locations in the vehicle.

Another difference between the heave control assembly 212 and the heave control assembly 312 is that the interconnection between the heave member 346 and the piston rod 52 is not a direct mechanical interconnection but a fluid interconnection. Indeed, the heave member 346 is the piston rod of a hydraulic cylinder 348 provided with a fluid chamber 350. The fluid chamber 350 is in fluid connection, via the fluid conduit 318, with a hydraulic cylinder 352 provided with a fluid chamber 354 and housing the piston rod 52. The hydraulic cylinder 352 is pivotally mounted to the frame 214 via a pivot pin 353. The fluid chamber 350 is also connected to a gas spring 356 via a fluid conduit 358 and a piston rod 360.

As will be appreciated by one skilled in the art, the operation of the suspension 310 is similar to the operation of the suspension 210. The gas spring 356 performs the function of the spring 252 of FIG. 11, which is, generally, to provide a heave which is a function of the downforce.

An advantage of the suspension 310 is that the first portion 314 and the second portion 316 of the heave control assembly 312 may be positioned at different location on the vehicle since they are connected only by a fluid conduit 318.

Figure 13:
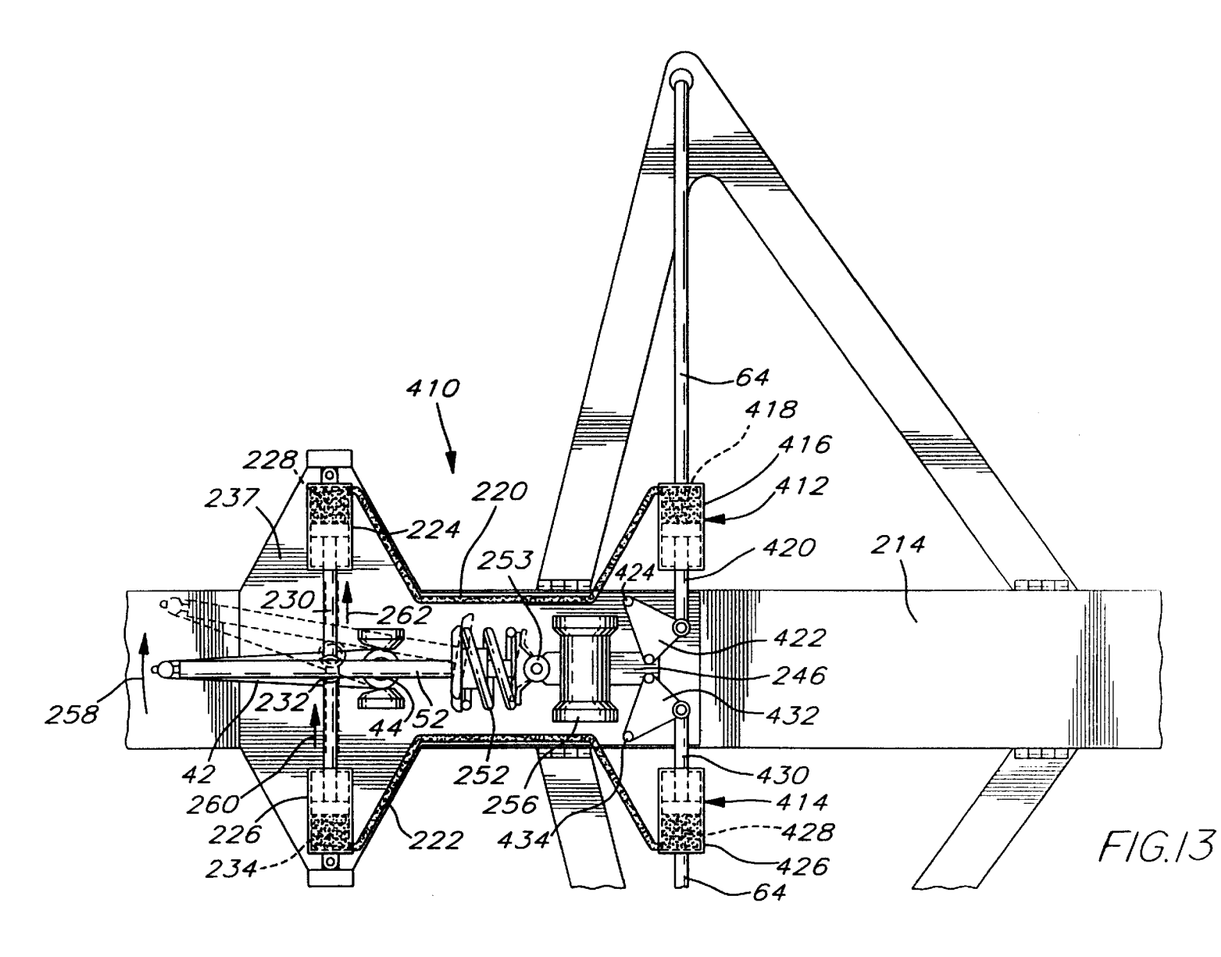
FIG. 13 shows a partial top plan view of a suspension system according to a fifth embodiment of the present invention in a symmetrically loaded configuration, in full lines, and in a roll situation, in dashed lines.

Turning now to FIG. 13 of the appended drawings, a suspension 410 according to a fifth embodiment of the present invention will be described.

The major difference between the suspension 410 and the suspension 210 concerns the interconnection between the motion transmitting rods 64 and the other elements of the suspension 410.

The suspension 410 includes a pair of hydraulic actuators 412, 414. The hydraulic actuator 412 includes a housing 416 connected to one motion transmitting rod 64, a fluid chamber 418, to which the fluid conduit 220 is connected and a piston rod 420 connected to the heave member 246 via a pivotable heave lever 422 pivotally mounted to the frame 214 via a pivot pin 424. Similarly, the hydraulic actuator 414 includes a housing 426 connected to one motion transmitting rod 64, a fluid chamber 428, to which the fluid conduit 222 is connected and a piston rod 430 connected to the heave member 246 via a pivotable heave lever 432 pivotally mounted to the frame 214 via a pivot pin 434.

As will be apparent to one skilled in the art, the operation of the suspension 410 of FIG. 13 is similar to the operation of the suspensions 210 of FIG. 11 and 310 of FIG. 12 as described hereinabove. Indeed, the spring 252 will provide a resistance to heave that is a function of the downforce.

It should be understood that the specific geometry and size of the various components should be optimised for each specific situation and, hence, a suspension system using the hereinabove mentioned characteristics could be configured differently without departing from the scope of the present invention.

As will be easily understood by one of ordinary skill in the art, in certain cases, the base member 237 could be the frame 214 of the vehicle. Indeed, in some cases, the various elements connected to the base member 237 could be mounted directly to the frame 214 of the vehicle, which would then constitute a base member for these elements.

Although the present invention has been described hereinabove by way of a preferred embodiment thereof, this embodiment can be modified at will, within the scope of the appended claims, without departing from the spirit and nature of the subject invention.

What is claimed is:

1. A suspension system for controlling the relative displacement between a pair of laterally opposed ground engaging assemblies of a vehicle and a longitudinal frame of the vehicle, said suspension system comprising:

a base member;

a suspension member pivotally mounted to said base member;

a biasing arrangement mounted between said base member and said suspension member to bias said suspension member towards a predetermined position;

a pair of elongated motion transmitting members, each said motion transmitting member having a distal end swingably mounted to one of the laterally opposed ground engaging assemblies, and a proximate end coupled to said suspension member; wherein the relative displacement between the pair of laterally opposed ground assemblies and the longitudinal frame is transferred to said suspension member by said elongated motion transmitting members to thereby enable said suspension member to control the relative displacement between the pair of laterally opposed ground engaging assemblies of the vehicle and the frame of the vehicle.

2. A suspension system as defined in claim 1, further comprising at least one hydraulic actuator to couple said motion transmitting members to said suspension member, wherein the relative displacement between said pair of laterally opposed ground assemblies and the longitudinal frame is transferred to said biasing arrangement via hydraulic fluid present in said hydraulic actuator.

3. A suspension system as defined in claim 2, further comprising at least one hydraulic cylinder mounted to said base member and hydraulically connected to said at least one hydraulic actuator; each said at least one hydraulic cylinder being provided with a piston rod connected to said suspension member.

4. A suspension system as defined in claim 3, wherein (a) said at least one hydraulic actuator includes two hydraulic actuators each associated with one motion transmitting member, and (b) said at least one hydraulic cylinder includes two hydraulic cylinders each hydraulically connected to a respective hydraulic actuator, wherein hydraulic fluid may be bidirectionally transferred between connected hydraulic actuators and hydraulic cylinders.

5. A suspension system as defined in claim 4, wherein said hydraulic cylinders are positioned on either sides of said suspension member.

6. A suspension system as defined in claim 4, wherein said biasing arrangement is a portion of a heave control assembly further including:

- a pair of heave hydraulic cylinders provided with a piston rod so configured as to be longitudinally moveable; each heave hydraulic cylinder being connected to a respective hydraulic actuator;
- a longitudinally moveable heave member connected to both said piston rods of said heave hydraulic cylinders; and
- a heave piston rod pivotally mounted between said heave member and said suspension member; said piston rod biasing said pivotable suspension member towards a predetermined position.

7. A suspension system as defined in claim 6, wherein said heave control assembly further includes a helicoidal suspension spring mounted between said heave member and said heave piston rod.

8. A suspension system as defined in claim 6, wherein said heave control assembly further includes:

- a first heave hydraulic cylinder associated with said moveable heave member;
- a second heave hydraulic cylinder hydraulically connected to said first heave cylinder; said heave cylinder being mounted between said base member and said heave piston rod; and
- a gas spring assembly connected to said first and second heave hydraulic cylinders.

9. A suspension system as defined in claim 4, wherein said biasing arrangement is a portion of a heave control assembly further including:

- a pair of pivotable heave levers; each heave lever being connected to a respective hydraulic actuator;
- a longitudinally moveable heave member connected to both said heave levers; and
- a heave piston rod pivotally mounted between said heave member and said suspension member; said piston rod biasing said pivotable suspension member towards a predetermined position.

10. A suspension system as defined in claim 9, wherein said heave control assembly further includes a helicoidal suspension spring mounted between said heave member and said heave piston rod.

11. A suspension system as defined in claim 1, wherein each said distal end of said pair of elongated motion transmitting members is swingably mounted to one of the laterally opposed ground engaging assemblies through a universal joint.

* * * * *